United States Patent [19]

King et al.

[11] Patent Number: 5,764,414
[45] Date of Patent: Jun. 9, 1998

[54] BIOCULAR DISPLAY SYSTEM USING BINARY OPTICS

[75] Inventors: William B. King, Rancho Palos Verdes; Chungte W. Chen, Irvine, both of Calif.

[73] Assignee: Hughes Aircraft Company, Los Angeles, Calif.

[21] Appl. No.: 110,473

[22] Filed: Aug. 23, 1993

Related U.S. Application Data

[63] Continuation of Ser. No. 747,064, Aug. 19, 1991, abandoned.

[51] Int. Cl.$^6$ .............. G02B 5/18; G02B 5/32; G02B 3/08
[52] U.S. Cl. .............. 359/566; 359/565; 359/13
[58] Field of Search .............. 359/13, 14, 565, 359/566, 571, 630, 631, 639, 640, 741, 742

[56] References Cited

U.S. PATENT DOCUMENTS 3,737,212   6/1973   Antonson et al. .............. 359/14
4,261,635   4/1981   Freeman .............. 359/13
4,895,790   1/1990   Swanson et al. .............. 359/642

OTHER PUBLICATIONS

C.J. Swanson, W.B. Veldkamp, INFRARED APPLICATIONS OF DIFFRACTIVE OPTICAL ELEMENTS, SPIE Proceedings, vol. 885, paper No. 22, 1988.

*Primary Examiner*—William L. Sikes
*Assistant Examiner*—David R. Parsons
*Attorney, Agent, or Firm*—H. P. Gortler; M. W. Sales; W. K. Denson-Low

[57] ABSTRACT

A biocular display system (19) for generating a virtual image (30) of a visible display (20). A diffractive binary optical element (22) is used to create the virtual image (30). The binary optical element (22) contains magnifying power to increase the size of the virtual image (30). Also, the binary optical element (22) contains prismatic power to displace the virtual image (30) away from the display (20). Multiple displays (40), (42) may be viewed by employing a binary optical element (34) having multiple diffractive orders.

22 Claims, 2 Drawing Sheets

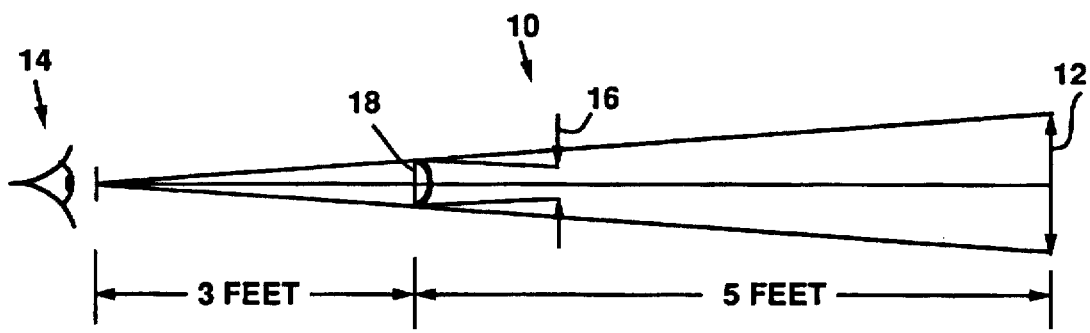
FIG. 1.
(PRIOR ART)
FIG. 2.
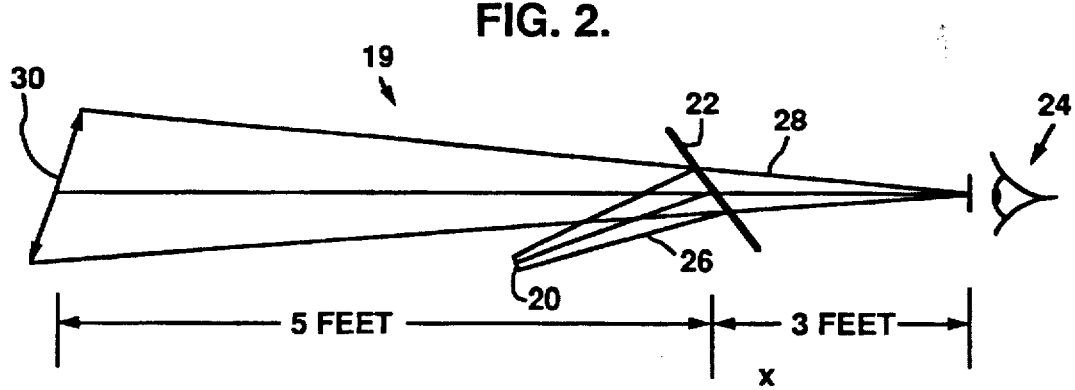
FIG. 3.
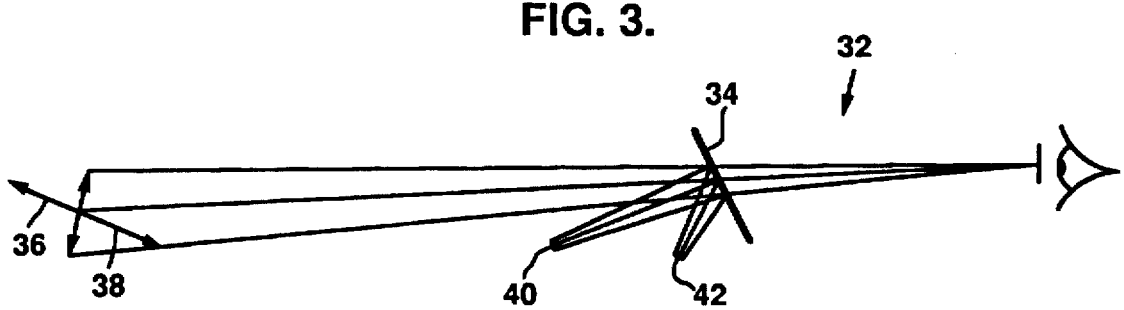

BIOCULAR DISPLAY SYSTEM USING BINARY OPTICS

This is a continuation of application Ser. No. 07/747,064 filed Aug. 19, 1991, now abandoned.

BACKGROUND OF THE INVENTION

1. Technical Field

This invention relates to biocular display systems, and more particularly to a biocular display system incorporating a binary optical device to create a virtual image of a display.

2. Discussion

Many varieties of display systems require the user frequently looks toward and away from the display and onto a different display or scene. This process can be uncomfortable to the viewer when a display appears at a different distance than the other objects to be viewed. This is because the viewer must refocus his eyes (requiring intraocular muscular action) each time he views the display. This problem is familiar to persons driving automobiles who must refocus their eyes from the more relaxed state when viewing the road each time they look at the instrument panel. This continual refocusing can create driver fatigue and eye strain as well as distract the driver from attending to driving tasks.

The problem of refocusing to view near field displays is common in many settings besides automobiles. In response, a number of biocular display systems have been developed. One promising approach has been to design a biocular display system such that the viewer, instead of viewing the display element directly, views a virtual image of the display which appears to be located in space at a point more distant than the actual display. Thus, for example, if the virtual image is located at about 8 feet in front of the driver, it is quite comfortable for the driver to shift fixation from the road to the virtual image since very little refocusing is required between these two distances.

The creation of a virtual image by a biocular display system is not without some difficulty. For example, where the optical path of light from the display to the viewer is coaxial with the optical path from the viewer to the virtual image, the display, as well as the biocular display optics, are likely to present an obstructed, cluttered view adjacent to the virtual image.

To overcome this difficulty, a number of systems have been developed which deviate the path of light from the display to the viewer in such a way that the virtual image appears displaced and out of the way of the display device. Such systems are often referred to as head up displays since the display image can be placed at a location which does not require significant deviation downward from a straight ahead viewing position. However, the optics required to introduce this displacement of the virtual image from the display, which may include for example dichroic beam splitters, holographic or periscope type systems, often are additional cost and technical complexity (for example alignment difficulties) that cannot be justified for many applications. Additional difficulties with biocular display systems which create a virtual image include poor image quality, distortion and limited field of view. A limited field of view is a problem since it limits the size and number of display elements which can be presented to the viewer.

Consequently, it would be desirable to provide a biocular display system which creates a virtual image at a comfortable viewing range to eliminate the necessity of frequently refocusing by the viewer. In addition, it would be desirable to provide such a biocular display system which employs simple and inexpensive optical components. Further, it would be desirable to provide such a system which avoids obstructing the field of view of the viewer by displacing the location of the virtual image from the display. In addition, it would be desirable to provide a biocular display system with the above advantages which provide good image quality with little distortion and a relatively wide field of view.

SUMMARY OF THE INVENTION

Pursuant to the present invention, a biocular display system is provided that generates a virtual image of a visible display. The virtual image is created by a diffractive binary optical element. The virtual image appears to the viewer to be located farther away than the display means. In addition, the binary optical element provides magnifying power to increase the size of the virtual image.

In accordance with another aspect of the present invention, a biocular display system is provided for generating a virtual image of a visible display. A diffractive binary optical element displaces the virtual image away from the visible display means by introducing prismatic power.

In accordance with another embodiment of the present invention the biocular display system includes a second visual display which emits light incident on the binary optical device at a different angle from the first visual display. The system thus presents multiple virtual images of multiple displays. By using a diffractive binary optical element the present invention eliminates a number of optical elements which would otherwise be required in the biocular display system. In addition, the present invention provides a biocular display system which is relatively inexpensive while providing a good quality image with little distortion and wide field of view.

BRIEF DESCRIPTION OF THE DRAWINGS

The various advantages of the present invention will become apparent to one skilled in the art by reading the following specification and by reference to the following drawings in which:

FIG. 1 is a diagram of a prior art biocular display system for creating a virtual image of a display;

FIG. 2 is a diagram of a biocular display system in accordance with the present invention for providing a virtual image of a single display;

FIG. 3 is a diagram of a biocular display system in accordance with the present invention for providing two virtual images from two separate visual displays through different diffractive orders of a binary optical element;

FIG. 6 is a diagram of a series of Fresnel zone plate phase profiles.

DESCRIPTION OF THE PREFERRED EMBODIMENT

Figure 4:
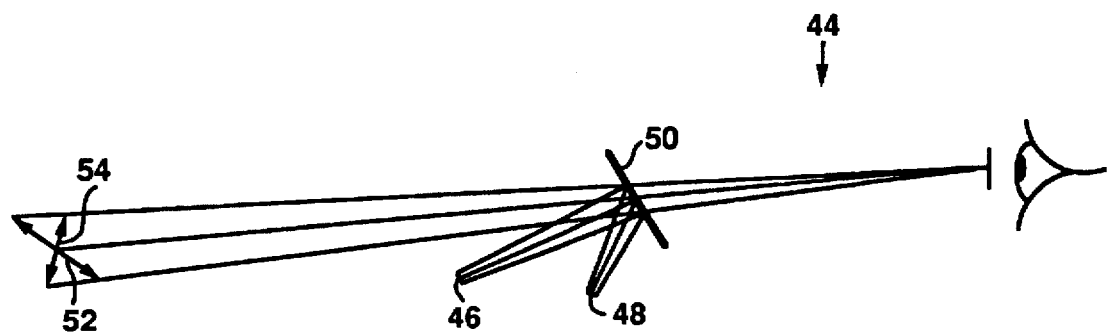
FIG. 4 is a diagram of an additional embodiment of a biocular display system in accordance with the present invention for creating two virtual images from two displays each generating different wavelengths of light.

Referring now to FIG. 1 a schematic diagram of a prior art biocular display system 10 is shown. The biocular display system 10 in FIG. 1 is used in applications such as instrument panels where it is desired to provide a virtual image 12 for a viewer 14 of an instrument panel 16 that appears farther away than the actual instrumental panel. As shown in FIG. 1 an optical element, which may be a lens 18, is positioned about 3 feet away from the viewer 14. The display element, which may be for example an instrument panel 16, projects light to the lens 18 and the lens 18 magnifies this image to the viewer 14.

It will be understood that by proper choice of lens element 18, a virtual image 12 will be created in an image plane behind the instrument panel 16. For example, in FIG. 1 the virtual image appears at a distance 5 feet behind the lens 18. The viewer 14 then sees the virtual image 12 of the instrument panel 16 at an apparent distance of 8 feet which is a comfortable viewing distance that requires little focusing of the eyes.

For example, with this system in an automobile the driver may glance from the road to the virtual image repeatedly without being required to refocus his eyes to any significant degree. This has the effect of reducing eye strain and driver fatigue as well as improving the driver's attention to the road. Unfortunately, in the configuration shown in FIG. 1 the biocular display system presents the display or virtual image 12 in the same viewing direction as the instrument panel 16. Because of this, the viewer 14 will find it obstructive, for example, where portions of the instrument panel appear around the edges of the lens 18.

Referring now to FIG. 2, there is shown a biocular display system 19 in accordance with the present invention which displaces the virtual image from the instrument panel. The instrument panel 20 emits light which is received by a diffractive binary optical element 22. The binary optical element introduces prismatic power in the gravitational direction (x-z plane) as well as magnifying power. The binary optical element 22 is located about 3 feet from the viewer 24. The light 26 from the instrument panel 20 passes through the binary optical element along path 28 to the viewer 24.

Due to the prismatic power and magnifying power of the binary optical element 22, the viewer 24 sees a virtual image 30 projected at a distance of about 5 feet from the binary optical element 22, or 8 feet from the viewer 24. In this way, the virtual image is displaced from the actual instrument panel 20 to eliminate the obstruction problem discussed above. Further, the system 19 shown in FIG. 2 achieves this displacement without the addition of expensive or complex optical elements which would be prohibitive in many applications, such as the illustrated automotive applications.

Those skilled in the art will appreciate that a binary optical element is a diffractive optical device which can behave similar to refractive optical elements. For example, prismatic power in the binary optical element is introduced by a diffractive surface profile consisting of a linear grating structure that is parallel to the y-z plane. For example, in FIG. 2 25 degrees of bending power is encoded in the binary optical element 22. The magnifying power is encoded on the binary optical element 22 with a zone plate structure with an effective focal length that is identical to that of a conventional display object such as the lens 18 in FIG. 1. It will be appreciated that since both the prismatic and magnifying power are diffractive elements, they can be combined as a single binary optical element 22 to simplify the fabrication process and to reduce unit cost. Alternatively, it can be appreciated that the configuration of the system 10 in FIG. 1 could be implemented with a binary optical element having magnifying power but no prismatic power.

In more detail, the zone plate structure in the binary optical element 22 necessary to generate magnifying power is a form of a fresnel zone plate. Further details about binary optical elements may be found in the publications: G. Swanson and W. Veldkamp, "Infrared Applications of Diffractive Optical Elements", SPIE Proceedings, Vol. 885, Paper No. 22, 1988; and D. Shafer and T. McHugh, "Binary Optics Design Surprises for the 1990's", SPIE Conference Proceedings, Orlando, Fla., March, 1989. Both of these articles are herein incorporated by reference. As discussed in these references, a fresnel zone plate face profile needed to achieve 100% efficiency requires curved wedge shaped structures with a height, or phase depth of $2\pi$. It will be appreciated that this phase depth is proportional to the wavelength. In visible wavelengths, the technology to produce a continuous curved phase profile does not exist. Thus, as an approximation of this desired phase profile however, the ideal continuous fresnel zone plate face profile can be approximated by quantizing and into discrete phase levels. The diffraction efficiency will be a function of the number of phase levels. Diffraction efficiencies in excess of 90% can be achieved by using, for example, integrated circuit fabrication techniques such as high resolution lithography, mask aligning and reactive ion etching.

FIG. 6 at the top shows an example of a Fresnel plate phase profile needed to achieve 100% efficiency. The two $\pi$ phase depths correspond to a material etch depth of about two $\mu$ for mid-infrared radiation. The middle and bottom curves shows the Fresnel zone plate phase profile quantized to two and four phase levels respectively. The two level profile results in an efficiency of 40.5% and the four level profile results in an efficiency of 81.0%. For these elements to be useful in infrared systems, it is necessary to achieve a diffraction efficiency of 90% or greater.

The zone plate structure of the binary optical element 22 can be very general to permit the binary optical element 22 to perform such functions as aberration reduction and distortion correction. The zone plate structure can be expressed by any set of polynomial forms with or without any symmetry. The practical limitation is the smallest feature size of the binary optical element 22, which is about 1 micrometer (1 µm) for the current technology. With the ability to provide such correction with the binary optical element 22 very good image quality in the system can be obtained despite the use of only a single binary optical element 22. It should be noted that the binary optical element 22 utilizing a fresnel zone plate is a diffractive optical element and should not be confused with fresnel lenses which are refractive lens elements. The process of determining the optimum design of a diffractive element for a given system is described below.

The simplest example of a highly efficient diffractive optical element is the phase Fresnel zone plate. Collimated monochromatic radiation incident on this structure will be diffracted with the light being focused perfectly. The necessary phase profile can be expressed in the simple form $$\phi(x,y)|_{2\pi} = \frac{2\pi}{\lambda} \sqrt{x^2 + y^2 + F^2} \quad (1)$$

where $\lambda$ is the wavelength, F the focal length, and $\nabla$ is evaluated modulo $2\pi$. The phase Fresnel zone plate is an interesting yet limited profile. In general it is desirable to be able to define arbitrary diffractive phase profiles.

There exist numerous commercially available lens design programs. Many of these programs allow one to describe a general diffractive phase profile on a given surface. The phase profile is described by making an analogy to the optical recording of holographic optical elements. The wavelength and location in space of two coherent point sources are defined and the resulting interference pattern describes the diffractive phase profile. This process describes more general profiles than a simple zone plate, however, is still a small subset of the possible profiles. In order to make the phase profiles span a much larger set of possibilities, an additional phase term $$\phi(x,y) = \frac{2\pi}{\gamma} \sum_{n,m} a_{nm} x^n y^m \quad (2)$$

can be added onto the phase determined from the two point sources. For on-axis phase profiles, the two point sources must lie on the optical axis. Furthermore, if the locations of the two point sources are both set to infinity, then the effect of their interference is nulled and the phase profile is completely described by the general polynomial expansion of equation (2). One of these general diffraction phase profiles can therefore be placed on any surface of an optical system.

Lens design programs have optimization routines that treat the curvatures of surfaces, the thickness of elements, and the element spacing as variables. Likewise, if a diffractive phase profile is in the system, the optimization routine can treat the polynomial coefficients, $\alpha_{nm}$, as variables. A lens optimization program will determine the optimum coefficients, $\alpha_{nm}$, of the diffractive phase profile for any particular lens system.

The diffractive phase profile determined by the lens design program and defined by equation (2) contains no information on how to achieve high diffraction efficiency. Out approach is to take the optimized $\alpha_{nm}$'s and from them define a set of binary amplitude masks. The algorithm for designing these masks is shown below. These binary amplitude masks will then be used in the actual construction of a high efficiency multi-level diffractive phase profile.

| MASK # | TRANSITION PTS. (l = 0, ±1, ±2, ...) | ETCH DEPTH | # PHASE LEVELS | % EFF. |
|---|---|---|---|---|
| 1 | $\phi(x,y) = (l+1)\pi$ | $\pi$ | 2 | 40.5 |
| 2 | $\phi(x,y) = \frac{(l+1)\pi}{2}$ | $\pi/2$ | 4 | 81.0 |
| 3 | $\phi(x,y) = \frac{(l+1)\pi}{4}$ | $\pi/4$ | 8 | 95.0 |
| 4 | $\phi(x,y) = \frac{(l+1)\pi}{8}$ | $\pi/8$ | 16 | 99.0 |

An additional advantage with the biocular display system 19 shown in FIG. 2 is that the system is relatively self-contained and can be moved up and down or tilted to adjust the line of sight to accommodate different positions of the viewer 24. For example, such adjustments may be desirable to adjust for different driver heights in an automotive application.

Referring now to FIG. 3 a multiple-channel biocular display system 32 in accordance with the present invention is shown. The multi channel biocular display system 32 shown in FIG. 3 utilizes different diffracted orders of a binary optical element 34 to create virtual images 36 and 38 of two different instrument panel displays 40 and 42 respectively. It will be appreciated that binary optical element 34 in FIG. 3 is the same as the binary optical element 22 of FIG. 2; it contains only a single grating structure having a single prismatic power, and it will provide two virtual images from separate visual displays through different diffractive orders. The first display 40 is located at the conjugate corresponding to the first diffracted order, and the second display 42 is located at the conjugate corresponding to the second diffracted order. Thus, by choosing the bending power of a grating structure to produce the desired prismatic power for the first instrument display 40; the same prismatic and optical powers generate the second order diffraction and produce a desired position for virtual image 38 of the instrument display 42. Therefore, a single binary optical element 34 can be used to produce the configuration 32 in FIG. 3.

The biocular display system 32 in FIG. 3 combines prismatic and magnifying powers in the binary optical element 34 in a coherent manner. That is, the prismatic and magnifying power are combined as a single diffractive optical element 34. It will be appreciated that the virtual images 36 and 38 resulting can be either in the same line of sight or with some angular offset that can be determined by the prismatic power chosen. In this way, biocular display system 32 greatly expands the usefulness and effective field of view of the binary optical element 34 over the single channel biocular display system 19 shown in FIG. 2. While only two channels utilizing two diffracted orders of binary optical element 34 are shown in FIG. 3, it will be appreciated that additional channels may be employed in a similar manner by using other diffractive orders of binary optical element 34.

Another system utilizing coherently combined prismatic and magnifying powers is shown in FIG. 4. However, this biocular display system 44 shows an alternative way to accomplish multiple-channel display by utilizing different wavelengths instead of different diffracted orders. Display instrument 46 generates light at a first wavelength while display instrument 48 generates light at a second wavelength. Binary optical element 50 produces virtual images 52 and 54 respectively of the instrument displays 46 and 48. Since the prismatic and magnifying powers of binary optical element 50 are linearly proportional to the ratio of the wavelengths, the position of these display instruments 46, 48 can be adjusted according to their wavelength ratio. Thus, by the proper selection of the wavelengths for instrument display 46 and instrument display 48, as well as by the selection of the prismatic power for the single diffracted order of binary optical element 50, the design of the biocular display system 44 can be produced to generate virtual images 52 and 54 in the desired position.

It will be appreciated that binary optical element such as the one 50 shown in FIG. 4 are very sensitive to wavelengths and it is preferred that instrument displays 46 and 48 are relatively monochromatic. This is because if bright light is used unwanted spectrum will be produced. Of course, a number of design techniques may be utilized to produce the monochromatic display wavelengths for display instruments 46 and 48. For example, LED devices emitting desired wavelengths may be selected, or white light may be filtered using appropriate filters.

Figure 5:
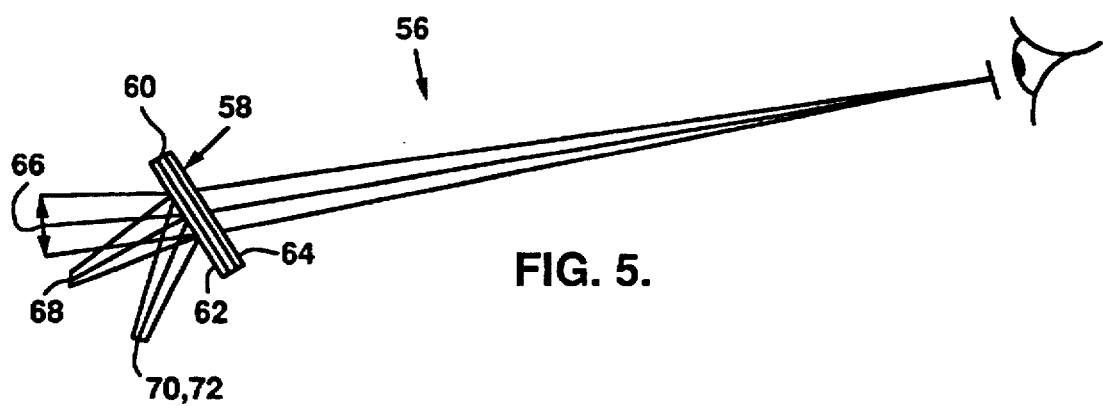
FIG. 5 is a diagram of another embodiment of the biocular display system in accordance with the present invention wherein prismatic and magnifying powers are incoherently combined on a binary optical element.

Alternatively, prismatic and magnifying powers may be combined in an incoherent manner. This means that the prismatic power and magnifying power are optically separated. That is, light impinging onto an optical element either first experiences the prismatic power or the magnifying power, but not both of them simultaneously as shown in FIGS. 2-4. FIG. 5 illustrates an additional embodiment of the present invention where prismatic and magnifying powers are combined incoherently. A biocular display system 56 contains a binary optical element 58 which comprises a substrate 60 having magnifying power encoded on a first side 62 of the substrate and prismatic power encoded on a second side 64 of the substrate. A first instrument display 66 and a second instrument display 68, when viewed through the binary optical element 58, generate virtual images 70 and 72 of the displays 66 and 68. It has been found that the biocular display system 56 has very good aberration and diffraction efficiency control for all different channels. It will also be noted that the magnifying power binary optical element 62 and the prismatic power binary optical element 64 could be independently encoded on the same of the substrate 60. This may be done, for example, by placing them on the side facing the instrument panel to avoid exposure or damage. In this case, the prismatic power binary optical element 64 and magnifying power binary optical element 62 would simply be stacked on top of each other.

It will be appreciated that in each of the multi-channel biocular display systems shown in FIGS. 3-5, the virtual images from the two channels do not have to lie in the same plane. Thus, by choosing one channel to produce an image at a close range and one farther away, and by incorporating different magnified powers into the two channels, a three dimensional effect results. This sensation of depth can give an extra dimension of realism to the instruments displayed.

It will also be appreciated that while it is preferred that binary optical elements be utilized in the present invention, volume holographic optical elements may be used to replace the binary optical elements. However, binary optical elements are preferred over holographic optic elements because of the easy fabrication, low costs, and low sensitivity to environmental changes such as temperature and moisture. Further, the diffraction efficiency of the binary optical elements is easily controlled.

A number of different techniques may be used to fabricate inexpensive binary optical elements for the instrument display biocular systems shown above. The first technique involves molding the binary optical element on one side of the instrument panel cover. This technique is very similar to the fabrication method of molded plastic optical elements. The grating structure of the prismatic as well as magnifying power is imprinted on one side of the cover plate. Alternatively, a hybrid biocular display element with a plastic lens to provide the magnifying power, and a binary optical element imprinted on one side of the plastic lens for the prismatic power may be employed.

A second fabrication technique is to replicate the binary optical, element on the instrument panel cover. This technique is basically similar to that of grating replication.

In another embodiment of the present invention, the binary optical element is fabricated in a method similar to that of integrated circuits. It will be appreciated that recent developments in the integrated circuit industry has resulted in an extensive technology base for the miniaturization of circuits. Three essential tools that were developed are electron-beam pattern generators, reactive ion etchers, and mask aligners. E-beam pattern generators are capable of drawing binary amplitude patterns with feature sizes of 0.1 µm and positioning the features to a an even greater accuracy. Reactive ion etchers can etch a binary profile to depths of a few microns with an accuracy on the order of tens of angstroms. Mask aligners are used routinely to align two patterns with an accuracy of fractions of a micron. These are the key technological advances that make it possible to produce high quality diffractive phase profiles.

Electron beam pattern generators produce masks that have binary transmittants profiles. A thin layer of chrome on an optically flat quartz substrate is patterned by the E-beam machine. The input to the E-beam patterned generator is a file stored on a computer tape and properly formatted for the particular machine. An algorithm which defines the patterns to be drawn from multi-level diffractive elements is described in the above referenced article by Swanson and Veldkamp. The number of phase levels in the final diffractive element constructed from these masks, is $2^n$ where n is the number of masks. For example, only four masks will produce 16 phase levels resulting in an efficiency of 99%. The binary amplitude masks produced from the patterned generator are then used to construct the multi-level optical element. Further details of the fabrication process are shown in the above referenced article by Swanson and Veldkamp.

The desired characteristics of the binary optical elements utilized in accordance with the present invention can be derived using conventional lens design techniques, or using well known lens design programs. Further, the above referenced article by Swanson and Veldkamp gives further details on the use of lens design programs to optimize parameters in the diffractive phase profile for binary optical elements. Commercial binary optical element manufacturing firms may be used to construct the binary optical elements from the formulas derived. For example, Hughes Danbury Optical Systems, division of Hughes Aircraft Company in Danbury, Conn., is an example of a manufacturing company capable of transforming these design formulas into working binary optical elements.

From the foregoing, it can be seen that the present invention provides a biocular display system that can generate a virtual image of a visible display means using a diffractive binary optical element. This system employs simple and inexpensive optical components with good image quality, little distortion and a relatively wide field of view. In addition, multiple channels of display can be presented through a single binary optical element.

Those skilled in the art can appreciate that other advantages can be obtained from the use of this invention and that modification can be made without departing from the true spirit of the invention after studying the specification, drawing and following claims. For example, the binary optical element could be a reflective optical element.

What is claimed is:

1. A biocular display system comprising:

a first visual display means which emits light;

a binary optical element means for receiving light from said visual display at a first angle and generating a first virtual image visible to a viewer;

said binary optical element means having magnifying power so that said virtual image appears larger than said visual display means to said viewer; and said first virtual image being located in space at a distance from said viewer that is longer than the optical path from said viewer to said visual display means.

2. The biocular display system of claim 1 wherein said binary optical element means provides a first prismatic power, wherein the optical path from said display means to said viewer is not coaxial with said optical path from said binary optical element means to said user.

3. The biocular display system of claim 2 wherein said binary optical element means is a transmissive type binary optical element.

4. The biocular optical display system of claim 2 further comprising:

a second visual display means for emitting light, said second visual display means disposed so that said binary optical element means receives light from said second visual display means at a second angle; and said binary optical element means provides a second prismatic power for said light at said second angle, wherein said light from said second visual display means is coaxial with said light from said first visual display means along the path from said binary optical element to said viewer.

5. The biocular optical system of claim 4 wherein said binary optical element means uses different diffractive orders to produce different prismatic powers for said first and second visual display means.

6. The biocular optical system of claim 4 wherein said first and second visual display means each emit generally monochromatic light, the light for each visual display means being at different wave lengths, and said binary optical element means produces different prismatic powers for said different wave lengths.

7. The biocular optical system of claim 4 wherein said binary optical element means generates a second virtual image for said second display means that has a different apparent depth than said first virtual image.

8. The biocular display system of claim 2 wherein said binary optical element means comprises a prismatic power binary optical element and a magnifying power binary optical element which are coherently constructed on a single surface.

9. The biocular display system of claim 2 wherein said binary optical element means comprises a prismatic power binary optical element, and a magnifying power binary optical element which are incoherently constructed on separate surfaces.

10. The biocular display system of claim 2 wherein said system is part of a head up display system.

11. The biocular display system of claim 1 wherein said virtual image is located in space at a distance that is more than twice as long as the optical path from said viewer to said visual display means.

12. The biocular display system of claim 1 wherein said visual display means is an instrument panel.

13. A biocular display system comprising:

a first visual display means for emitting light;

a binary optical element means for receiving light from said visual display at a first angle for generating a first virtual image visible to a viewer;

said binary optical element means having prismatic power wherein the optical path from said visual display means to said viewer is not coaxial with said optical path from said binary optical element to said viewer; and said first virtual image being located in space at a distance from said viewer that is longer than the optical path from said user to said visual display means.

14. The biocular display system of claim 13 wherein said virtual image is located in space at a distance that is more than twice as long as the optical path from said viewer to said visual display means.

15. The biocular display system of claim 13 further comprising:

a second visual display means for emitting light, said second visual display means disposed so that said binary optical element means receives light from said second visual display means at a second angle; and said binary optical element means provides a second prismatic power for said light at said second angle, wherein said light from said second visual display means is coaxial with said light from said first visual display means along the path from said binary optical element means to said viewer.

16. The biocular display system of claim 15 wherein said binary optical element means uses different diffractive orders to produce different prismatic powers for said first and second visual display means.

17. The biocular display system of claim 15 wherein said first and second visual display means emit generally monochromatic light, the light for each visual display means being at different wave lengths, and said binary optical element means produces different prismatic powers for said different wave lengths.

18. The biocular display system of claim 15 wherein said binary optical element means generates a second virtual image for said second display means that has a different apparent depth than said first virtual image.

19. The biocular display system of claim 13 wherein said binary optical element comprises a prismatic power binary optical element means and a magnifying power binary optical element which are coherently constructed on a single surface.

20. The biocular display system of claim 13 wherein said binary optical element means comprises a prismatic power binary optical element, and a magnifying power binary optical element which are incoherently constructed on separate surfaces.

21. The biocular display system of claim 13 wherein said visual display means is an instrument panel.

22. The biocular display system of claim 13 wherein said system is part of a head up display system.

* * * * *